United States Patent [19]

Hebrank

[11] Patent Number: 4,501,318
[45] Date of Patent: Feb. 26, 1985

[54] HEAT RECOVERY AND AIR PREHEATING APPARATUS

[76] Inventor: William H. Hebrank, 14 Hermitage Rd., Greenville, S.C. 29615

[21] Appl. No.: 428,189

[22] Filed: Sep. 29, 1982

[51] Int. Cl.³ .............................................. F28D 17/00
[52] U.S. Cl. ......................................... 165/1; 34/86; 55/267; 165/4; 165/7; 165/10
[58] Field of Search ............................ 165/4, 1, 7, 10; 55/267; 34/86

[56] References Cited

U.S. PATENT DOCUMENTS

| | | | |
|---|---|---|---|
| 1,994,515 | 3/1935 | Hausen et al. | 165/4 |
| 2,492,788 | 12/1949 | Dennis | 165/4 |
| 2,790,505 | 4/1957 | Dow | 55/267 |
| 3,756,310 | 9/1973 | Becker | 165/4 |

FOREIGN PATENT DOCUMENTS 1162503 2/1964 Fed. Rep. of Germany ...... 110/254

*Primary Examiner*—Albert W. Davis, Jr.
*Attorney, Agent, or Firm*—Cort Flint

[57] ABSTRACT

Heat recovery and replacement air preheating apparatus for use in industrial heat treating processes is disclosed as including at least a pair of thermal recovery and storage units, B, C wherein each storage unit contains a plurality of heat exchange elements 32, 33 which operate as heat sponges to pick up heat from exhausts as it leaves the dryer and subsequently to put that heat into entering replacement air whereby the cost in elevating the replacement air is greatly reduced. A control valve D, 62 connected between the two thermal storage units cycles the reverse exhaust and replacement air flows alternately through the thermal storage units in a manner that a substantial amount of exhaust heat is stored and transferred to the replacement air flow. The heat exchange elements 33 are carried at the cold end 30b of the thermal storage units and are of a different construction and material than elements 32 carried near the hot end 30a to permit condensation and removal of exhaust volatile contaminates without blocking flow through and to facilitate cleaning and disposal.

17 Claims, 14 Drawing Figures

HEAT RECOVERY AND AIR PREHEATING APPARATUS

BACKGROUND OF THE INVENTION

This invention relates to new and novel construction of thermal storage apparatus used with heat recovery regenerators so that exhaust contaminant condensed in heat transfer passages during industrial heat treating processes can be removed.

Heat recovery regenerators recover exhaust heat by passing exhaust gases through heat exchange elements carried in thermal storage units thus causing the element temperature to increase and the exhaust temperature to decrease. Heat is stored in the heat exchange elements in the thermal storage units. After a predetermined period of time the exhaust flow stops and clean replacement air for the oven is caused to flow through the same passages of the heat exchange elements but in the opposite direction. This flow of cool replacement air from the atmosphere causes the heat exchange element temperature to decrease and replacement air temperature to increase. After another predetermined period of time replacement air flow stops and the cycle just described is repeated over and over again.

In practice, a set of two thermal storage units is used such that one unit is passing exhaust while the other passes replacement air. This feature permits exhaust to continuously flow from the oven while at the same time permits replacement air to continuously flow into the oven. Heat recovered from exhaust gases has been returned to the oven as hot replacement air thus reducing the amount of fuel needed to generate heat for the oven's industrial processes.

Since exhaust and replacement air flow in opposite directions through the set of heat exchange elements, hot exhaust always enters the thermal storage unit from one end and cold replacement air always enters from the opposite end. For efficient heat exchange operation, the recycle time is kept short. If not cycled frequently a pronounced axial temperature gradient does not develop and high recovery efficiency is not developed. Therefore, the exhaust end of thermal storage is always hot and the replacement air end of thermal storage is always cold.

U.S. Pat. No. 3,712,597 discloses a series of bayonet type metallic recuperative heat exchangers utilized in combination with a continuous rotary regenerated air preheater in a glass manufacturing oven. The plugging and cleaning problems created by lint, oils and resins exhausted from industrial dryers are a major deterrent to the use of heat exchangers.

In applicant's U.S. Pat. No. 4,337,585 entitled HEAT RECOVERY AND AIR PREHEATING APPARATUS FOR TEXTILE DRYER OVENS, exhaust heat recovery and replacement air preheating apparatus is disclosed which includes a set of heat recovery and storage units installed in the walls of the dryer oven so that hot air exhausted from the dryer passes through one of the heat recovery and storage units. Cool replacement air simultaneously enters the dryer through the other of the heat recovery and storage units.

Typically, the prior arrangements have utilized heat storage elements arranged serially in the thermal storage units which are identical in construction and function which is primarily to absorb and store heat. Reverse flows through the storage unit removes lint and other solid contaminant particulate matter from the elements which act secondarily as filters.

The exhaust carries two kinds of contamination which in combination tend to plug heat exchangers. Lint made of fine fiber or dust will plug exchangers if the flow is continuous in direction. With this invention the reversing flow direction back flushes line out of the heat storage before it passes the hot end so it does not plug or move through with smoke to the cool end. The second contamination in the exhaust is smoke consisting of volatized oil and resin. Volatized oil and resin will condense when it contacts cool surfaces. It passes as gas through the hot storage end and condenses at the cold end but the lint has been separated out so buildup on surfaces is minimal. In U.S. Pat. No. 4,337,585, removal of the stationary storage elements is permitted at the cold end for simple periodic cleaning without interrupting dryer operation. Thus, condensed oil and resin buildup can be held at operational levels. The heat of exhaust is effectively prevented from reaching the ambient environment and the ducts remain relatively cool eliminating the need for costly insulation.

However, it has been found that through inadvertence and neglect, the heat exchange elements on the cold end of each thermal storage unit are not removed and cleaned regularly. If the elements on the cold end are not cleaned regularly, flow passages will eventually plug rendering the thermal units inoperative and will present a fire hazard. The cold end thus requires more frequent cleaning and it is often necessary to climb ten to twenty feet above floor level to reach the thermal storage unit on top of a large industrial oven. To accomplish practical heat recovery operation, thermal storage must be structured to accommodate cleaning condensible contaminants in a convenient and economical manner.

It has been found according to the present invention that the function and hence structure of the heat exchange elements at the hot and cold ends should be different. With respect to lint removal at the hot end, the heat storage elements function like the functioning of a filter to remove lint and other solid matter from the exhaust flow. With respect to removal of condensing volatiles at the cold end, the heat storage elements function like the functioning of a condenser and precipitate out resins and oils in the exhaust gas flow. The lint and other solid matter is cleaned from the hot end heat storage filter elements by reverse flow while the condensated resins and oils are removed by providing disposable condensor elements and/or draining the condensate from the cold end of the unit.

Accordingly, an important object of the present invention is to provide a heat recovery and storage apparatus for preheating replacement air in industrial ovens wherein the buildup of condensate in heat exchange elements on the cold end of a heat transfer unit and the problems attendant to the cleaning of the elements are reduced.

Another important object of this invention is to provide thermal storage units with heat storage elements of different scale and geometry in flow passages near the cold end to accept selective buildup of condensing contaminants without inhibiting air flow.

Another object of this invention is to provide thermal storage units having heat exchange elements fabricated from different materials or coated materials to accommodate high temperatures near the hot end of the storage units and to more easily accommodate cleaning contaminants condensed from exhaust near the cold end.

Still another object of the invention is to provide industrial thermal storage structure with heat exchange elements near the cold end that are different from those near the hot end in that they are lighter in construction to be more easily handled and carried for removal and/or cleaning.

SUMMARY OF THE INVENTION

The above objectives are accomplished according to the invention by providing in an industrial heat processing oven thermal storage units some exchange elements of more lasting, ceramic or metal construction near the hot end so that they can be removed for periodic cleaning of particulate matter or hardened scale from heat transfer surfaces and then put back into service at the hot end. However, near the cold end of the thermal storage unit, different heat storage elements of less durable glass or plastic construction are provided so that they can be removed, thrown away and replaced with clean elements or so that they can be removed and soaked in powerful solvents or distorted as a sponge for cleaning. Material surface coatings such as teflon can be utilized over metal to enhance the release of condensible contaminants. The cold end elements include material in matrix form which concentrates the buildup of condensing contaminants away from the flow passages and presents an increased surface area for condensation.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The drawings illustrate exhaust heat recovery and storage apparatus for preheating replacement air in an industrial oven wherein material is subjected to a heat treating process such as a textile dryer oven and the like which is heated by a suitable heating source.

Figure 1:
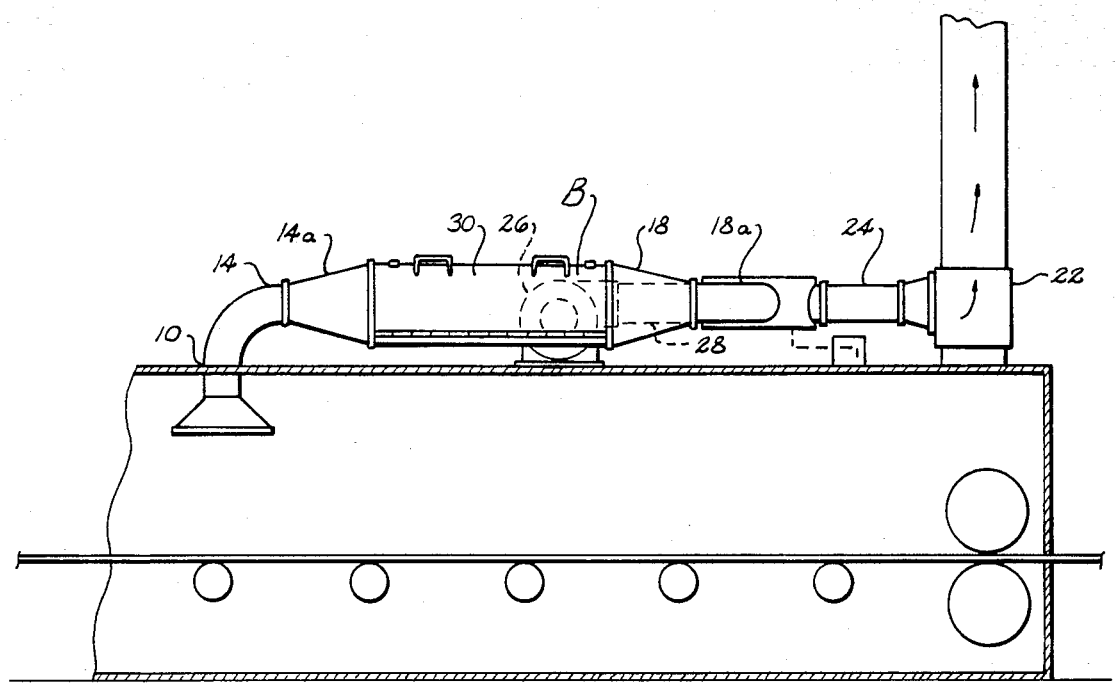
FIG. 1 is a side elevational view of heat recovery and storage apparatus for preheating replacement air on an industrial dryer oven with heat exchange filter and condensor elements according to the invention.
Figure 2:
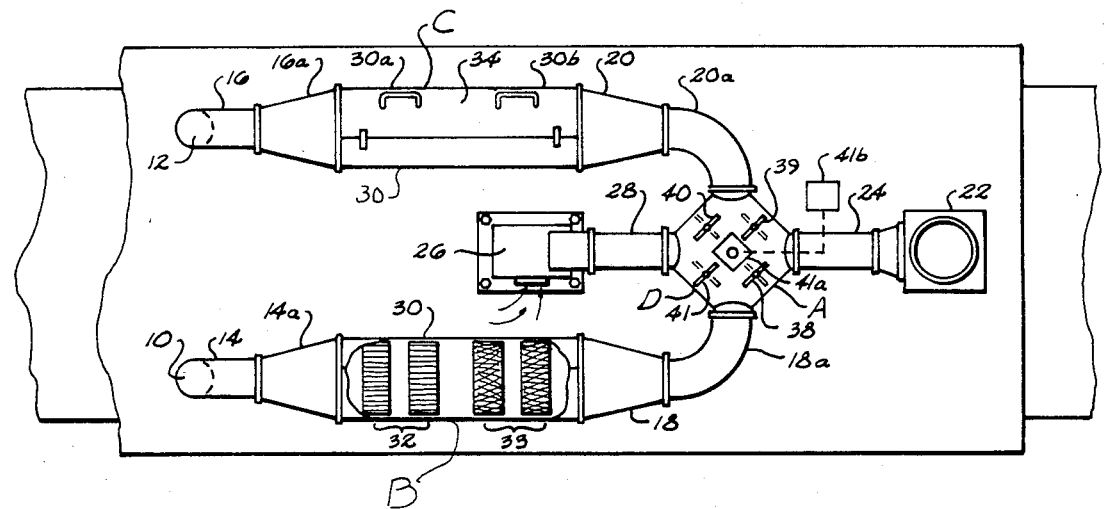
FIG. 2 is a top plan view of the apparatus of FIG. 1 illustrating valve means for cycling flow through the heat storage apparatus.

Referring to the FIG. 2, first and second port means are illustrated at 10 and 12, respectively. The duct means includes a section 14 and divergent section 14a connecting first thermal storage means to port 10 and similar sections 16 and 16a connecting port 12 to thermal storage means C. The duct means further includes divergent section 18 and elbow section 18a connecting the thermal storage unit B with valve manifold means A and similar sections 20 and 20a connecting storage means C and valve manifold A. Exhaust means may be provided by a suitable fan or blower 22 connected by means of a duct section 24 to the valve manifold A and replacement air may be delivered by a suitable blower means 26 by means of duct section 28 to the valve manifold means A.

Thermal storage means B and C are illustrated as including separate heat recovery and storage units each of which accommodates a single flow in one direction at a time. Each unit includes a housing 30 in which is contained a plurality of circular heat exchange elements 32 which are arranged in a series flow relationship one behind the other near the hot end 30a of the thermal storage units closest to the oven. At the cold end 30b remote from the hot end, a plurality of heat exchange elements 33 are carried which are of a different construction than elements 32 for accommodating and handling the buildup of condensate at the cold end as will be more fully explained hereinafter. Each element 32 includes an interior spiral strip 32a and zig-zag sinusoidal or triangular heat vanes 32b extending between adjacent runs of the spiral as illustrated. The housing is provided with an openable door section 34 whereby the individual heat absorbing elements may be removed for cleaning as necessary. It is preferred that the heat exchange elements be staggered so that the air passages 32c therein will not be in direct alignment but will repeatedly cut and divide the straight through flow exposing the vanes 32b of each heat absorbing element generally head on to the flow of air. Elements 32 and 33 may be of a disc or rectangular shape.

The valve means D may consist of four conventional butterfly valves 38, 39, 40, and 41. In a first position of the valve means (full line) exhaust air is delivered through port 10, storage means B, and outwardly through open butterfly valve 38 through the exhaust blower 22 wherein most of the heat from the exhaust is recovered and stored in unit B. Also in the first position, replacement air is delivered by fresh air fan 26 through the open butterfly valve 40, duct 20, through the heat storage unit C into port 12. In a second position of the valve means (dotted line) flow through the thermal storage units is in a reverse direction namely, the flow of exhaust gases is outwardly through port 12, thermal storage unit C and open valve 39 to the exhaust blower 22 wherein heat is stored in the unit C. The flow of replacement air is through the replacement air fan 26, open valve 41, heat storage unit B, which has previously been heated by exhaust flow, and port 10.

While the apparatus has been illustrated as being installed on the top of the dryer, it is to be understood that other mounting arrangements may be provided such as in the side wall of the dryer and that more than one pair of ports, thermal storage units, and valve manifolding may be provided along the length of the dryer oven whereby the oven interior will be kept at a more uniform temperature over the length thereof subjecting the cloth to more uniform heat treatment.

Any suitable means may be provided for alternating the individual valves of valve means D between the first and second positions described above such as a conventional pneumatic or electrical mechanism 41a controlled by a clock timer 41b. In a preferred embodiment the valves alternate every thirty seconds whereby the heat is purged by replacement air for thirty seconds every thirty seconds prior to exhaust gases reheating a particular thermal storage unit.

Figure 3:
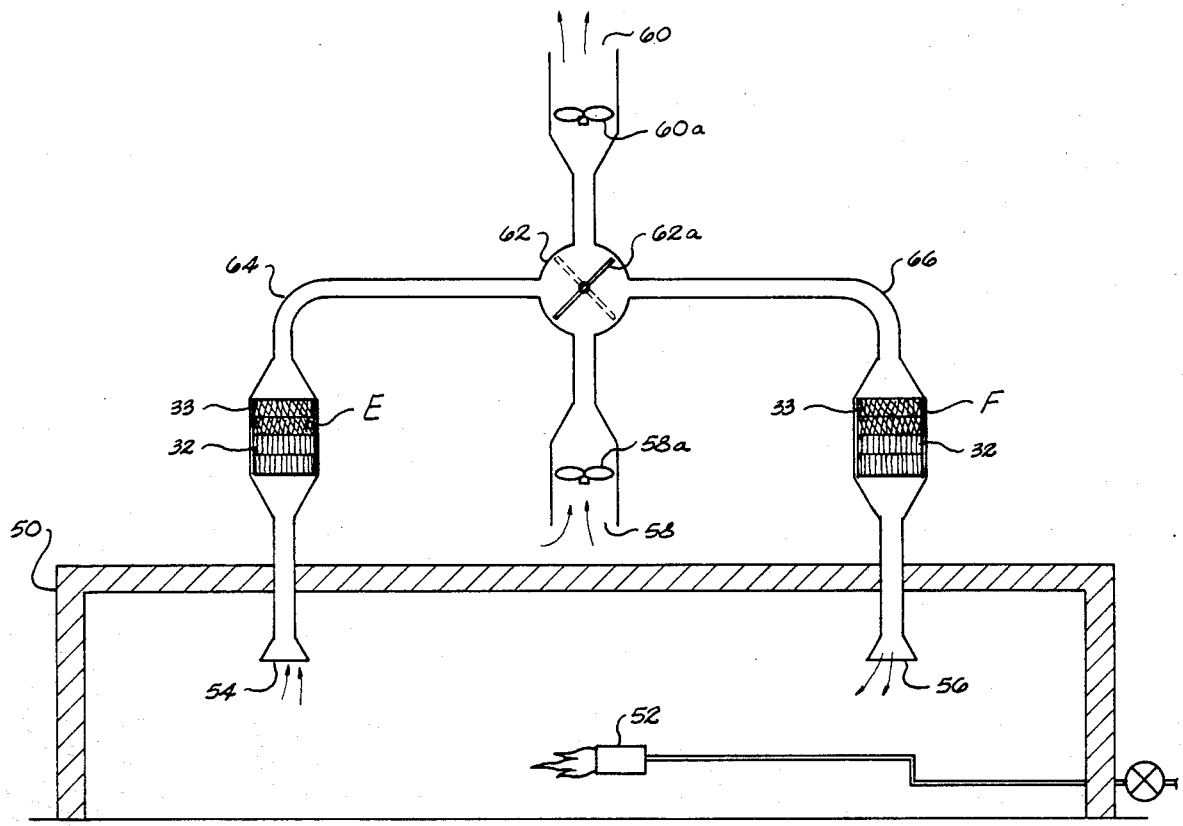
FIG. 3 is a schematic illustration of exhaust heat recovery and replacement air preheating apparatus according to the invention for an industrial oven with thermal storage units attached such that hot exhaust and hot replacement air alternately flow at each oven port.

FIG. 3 illustrates an alternate embodiment of apparatus according to the invention wherein thermal storage units E and F are mounted vertically on top of an industrial oven 50 having a burner 52 providing high temperature heat within the oven. Each thermal storage unit E and F contains a plurality of heat recovery and storage elements 32 and 33. Oven ports 54 and 56, alternately and in a cyclic manner, deliver replacement and exhaust air. Regenerator ports 58 and 60 are connected via valve manifold 62 and ducts 64, 66 to storage units E and F for the alternate and cyclic deliverance of replacement air and exhaust air to and from the oven ports 54 and 56. A blower 58a and 60a, respectively, is carried in the duct work of each regenerator port. A butterfly valve 62a is provided in a manifold 62 for selectively delivering the replacement air and exhaust.

In operation, with the valve 62a shown in the full line position of FIG. 3, exhaust goes through oven port 54, thermal transfer unit E, and duct 64 through the regenerator port 60 to the atmosphere. At the same time, replacement air enters regenerator port 58 and passes through duct 66 through the thermal transfer unit F into the oven 50 through oven port 56. When the valve 62 occupies the second, dotted line position the flows are reversed through the respective oven ports, thermal transfer units, and regenerator ports.

Figure 4:
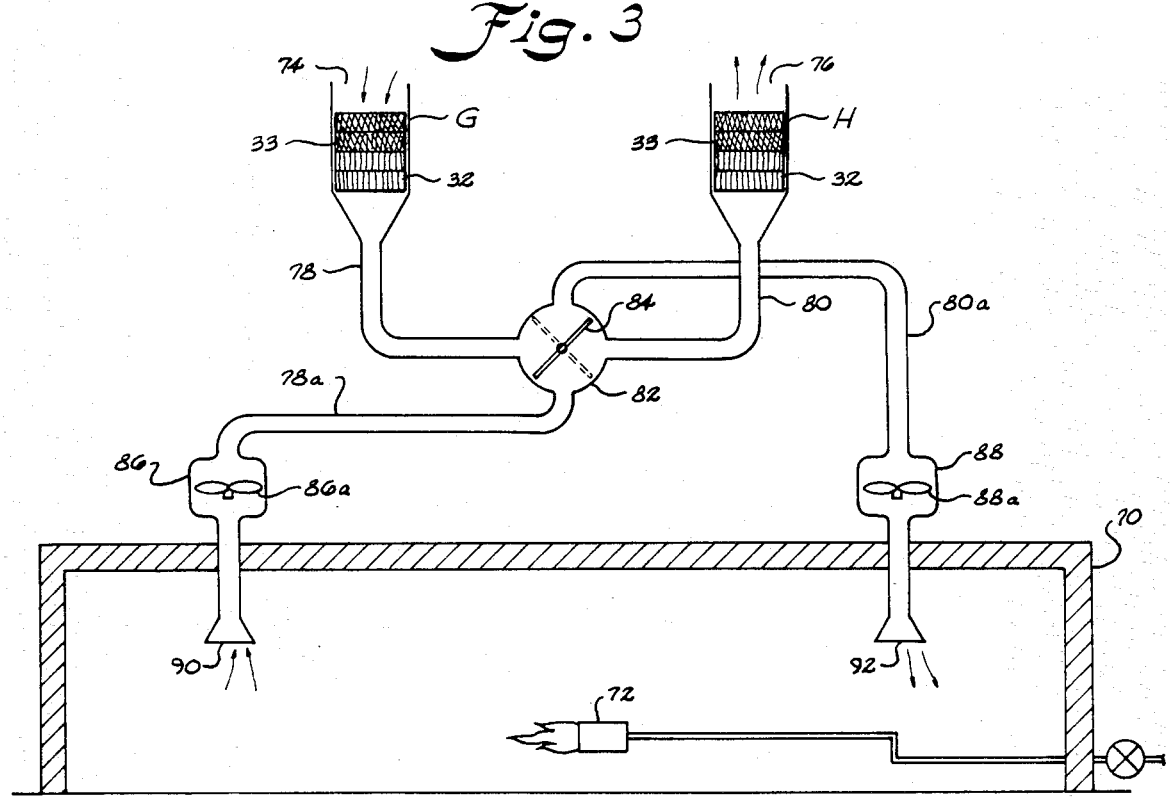
FIG. 4 is a schematic illustration of an embodiment of heat recovery and preheating apparatus according to the invention having thermal storage units attached such that hot exhaust always flows out of the same oven port location in the oven and hot replacement air always flows into the same oven port location in the oven.

FIG. 4 illustrates another embodiment wherein the flows of replacement air and exhaust gases are reversed in the thermal storage units in a cyclic manner but which always enter the oven at the same location and oven port. The apparatus is illustrated as including an industrial dryer oven 70 heated by means of a burner 72 having a pair of thermal storage units G and H which are illustrated schematically and may be disposed either vertically or horizontally as the application requires. Each thermal storage unit includes a plurality of the heat exchange elements 32 and 33. Each thermal transfer unit includes a regenerator port 74 and 76, respectively. Each thermal transfer unit is connected by means of a duct 78 and 80 to a valve manifold 82 which includes a butterfly valve 84. Valve manifold 82 is connected by way of ducts 78a and 80a to blower housings 86 and 88 containing blowers 86a and 88a whereby exhaust air and replacement air are delivered from and to the oven 70.

In operation, with valve 82 shown in its full line position, exhaust air enters oven port 90 and travels through duct 78a and 80 outwardly through the thermal storage unit H. Replacement air passes through regenerator port 74, thermal storage unit G, ducts 78 and 80a into the oven by means of oven port 92. With valve 84 positioned in its second, dotted line position, exhaust air still travels through oven port 90, duct 78a, but this time passes outwardly through thermal storage unit G and regenerator port 74 while replacement air travels in reverse direction through the thermal storage unit H but still enters the oven 70 through the oven port 92. This is an advantage in certain applications by always removing the exhaust air and introducing the replacement air at the same locations in the oven interior so as to provide a minimum amount of interruption in the air temperatures and currents therein.

Again it is noted that the heat exchange elements 33 at the cold end of the thermal transfer unit will be at the coolest temperatures since the exhaust air passes through these elements last and the cool replacement air passes through the elements first during the cyclic operation.

According to the present invention, heat exchange elements of more than one type are utilized in the various arrangements of thermal storage units to provide high heat recovery levels at the hot ends while maintaining open flow passages in the heat exchange elements at the cold ends. Heat exchange elements 32 are constructed from a metallic or other high temperature material having a high thermal composite while heat exchange elements 33 constructed in a matrix form of glass, plastic or other low temperature material having a lower thermal capacity but providing good condensation drainage and cleaning properties are utilized at the cold end of the thermal storage unit which, however, have a larger capacity to remove the condensible contaminants without plugging and may be disposed of rather than cleaned. In this sense, the cold elements are referred to interchangeably herein as condenser elements although the elements have some heat exchange ability.

Figures 9A, 9B, 9C:
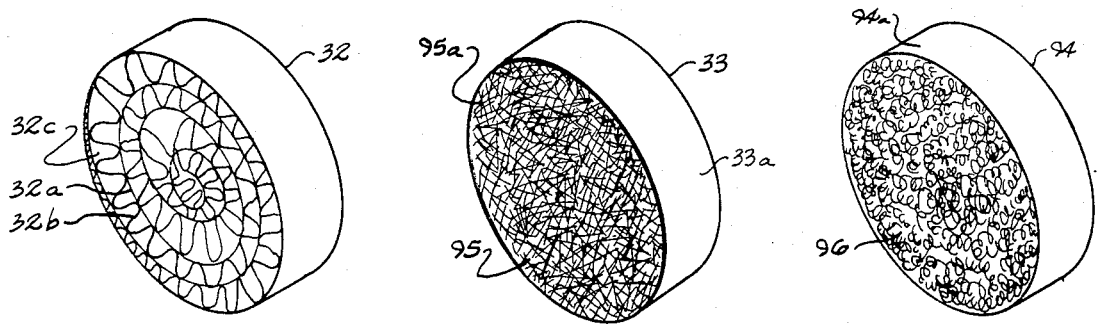
FIGS. 9a, 9b and 9c are perspective views of heat exchange elements according to the invention.
Figure 9D:
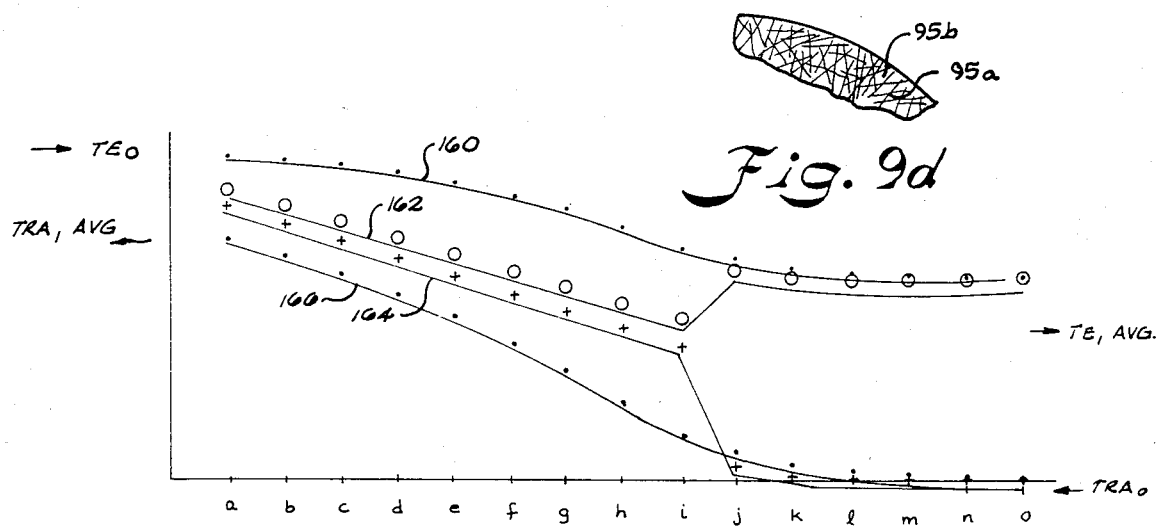
FIG. 9d is an enlarged partial view of the element of FIG. 9b illustrating the intersections and passages of the matrix form of the material according to the invention.

FIGS. 9a through 9c illustrate three different heat storage element structures. FIG. 9a shows heat exchange element 32 having a cellular structure formed by interior boundary surface walls 32a, 32b of strip material having a dimension in the direction of flow which is substantial for good heat transfer and storage. The boundary walls define distinct flow passages 32c axial in nature and with uniform structure and cell geometry in size or scale. This structure when made of metal has excellent heat transfer and surface to cubic volume properties as well as high thermal storage capacity. For example, when the cells are fabricated with equilateral triangle geometry, the side vane walls 32b of a triangle being ⅜ of an inch, made from 0.018 inch sheet metal the structure provides 221.7 square feet of heat transfer surface per cubic foot and weighs 83.1 pounds per cubic foot. Using practical flux speeds of 4,000 pounds per hour per square foot for air flow at about 250 degrees Farenheit, a heat transfer co-efficient of 7.66 BTU per hour per square foot is provided. However, when used at the cold end of the thermal transfer unit, the large surface to volume collects a large amount of condensed exhaust contaminant tending to obstruct passage.

Furthermore, the heat storage elements may weigh 20 to 40 pounds, and therefore are heavy to handle for removal and cleaning. This is particularly true when considering that in some industrial applications, the elements may be located some twenty feet above the floor. It is therefore contemplated by this invention to utilize heat exchange elements constructed from different material at the cold end of the thermal transfer unit which may be disposed of and replaced rather than cleaned and may be made from a lighter material so that the element is easier to handle in either event. The construction not only enhances condensation but facilitates collection and removal of the condensate.

According to the invention, a matrix rather than cellular structure for the cold end heat exchange elements 33 and 94 is illustrated in FIGS. 9b through 9c, respectively. The matrix structure of element 33 is composed of elongated strands in the form of small diameter, short, possibly three to four inches long, randomly laid glass or plastic rods 95. FIG. 9c shows matrix structure composed of small diameter, continuous long rod lengths 96 randomly coiled into a heat element structure. The short rods 95 or continuous rod lengths 96 may be binded in mat form and then cut in the desired shape of element 33 or 194 and fixed structurally in a suitable outer shell member 33a or 94a which may be flexible such that cleaning solvent may be wrung out of the element like a sponge. Any suitable matrix binding, such as a conventional resin matrix, may be utilized to bind the strands in mat form.

It will be noted that the rod-like material 95 is generally dimensionless in the direction of flow but presents a substantial dimensional surface and surface area normal to the flow when arranged in the matrix structure. This provides increased surface for impingement and condensation of the volatile gases in the exhaust flow.

If these rods are made of glass 200 microns in diameter and exposed to the same flux speed of 4,000 pounds of air per hour per square foot, heat transfer co-efficients increase to 163 BTU per hour per square foot per degree Farenheit. Glass has a density of 139 pounds per cubic foot and in considering 1.5 pounds per cubic foot packing density, the 200 micron rods present a surface area of 65 square feet per cubic foot. Rods of 200 micron diameters with 1.5 pounds per cubic foot density at a flux of 4,000 pounds of air per square foot as presented above are useful parameters. However, larger rod diameters and large packing densities will provide increased heat transfer and allow faster valve recycling which may be more desirable to keep valve cycling frequency less than 3 to 4 cycles per minute.

In using a matrix structure for the cold end heat exchange element an added physical feature occurs due to the small radius of curvature and frequent intersection of rods in the matrix. Surface tension forces increase with small dimensions and tight angle crevices so that condensed contaminant from the exhaust will be held at intersections of rods 95a, 96a instead of building uniformly on all rod surfaces to close off flow passages. The flow passages such as 95b will be randomly and fairly undefined between the rods and their intersections through the matrix of material.

The glass or possibly other material such as polyethylene are viable low cost material candidates for throwaway contaminated heat storage elements where the temperatures are below 200 degrees Farenheit.

Figure 5:
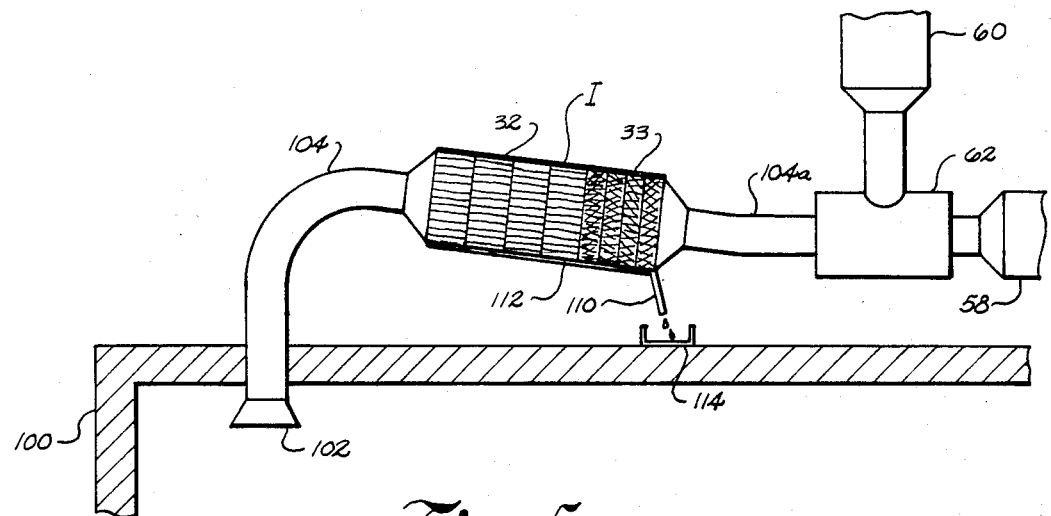
FIG. 5 is a partial cut-away view of an embodiment of apparatus for recovering heat and preheating replacement air for an industrial oven wherein the apparatus includes two different types of heat storage elements according to the present invention.

Referring now to FIG. 5, an embodiment of the invention is illustrated as including a thermal storage unit I carried on top of oven housing 100 and an oven port 102, which may be the exhaust port, connected to unit I by means of a duct 104. The remote end of thermal storage unit I is connected by means of duct 104a to valve manifold 62 such as that shown in FIG. 3. Manifold 62 is connected to replacement air and exhaust ducts 60 and 58, respectively, such as shown in FIG. 3. Another thermal storage unit I is connected to a second port (not shown) for replacement air for operating in alternating sequence.

The thermal storage unit I includes a plurality of heat storage elements 32 at the hot end of the thermal storage unit and a plurality of heat exchange elements 33 or 94 carried at the cold end of the thermal storage unit. The heat exchange elements 32 are preferably of the same configuration of that shown in FIG. 9a and are constructed from a metallic or other high temperature material for absorbing the heat from the exhaust gases quickly and completely and for transferring the heat to the reverse flow of replacement air. The heat exchange elements 33 or 94 are comprised of the smaller scale heat transfer surfaces so that the condensible exhaust contaminants condenses effectively and efficiently thereon. For this purpose, means for draining condensate is disclosed as including drain pipe 110 provided in a lower end of the thermal transfer unit housing 112 so that the contaminant condensed in liquid form drains out of the housing 112 into a container 114. It is noted that housing 112 is inclined about three-quarters of an inch to the foot to enhance the flow of condensed contaminant towards the cool end of the thermal storage unit I to the drain pipe 110. In practice, as much as 55 gallons of condensate a month has been drained from such a unit.

Figure 6:
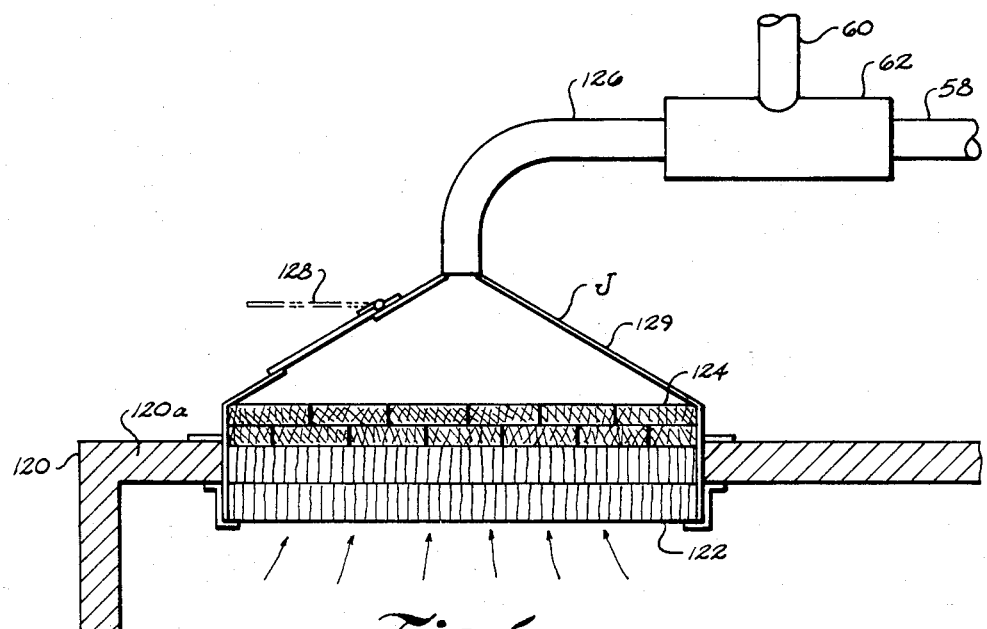
FIG. 6 is a partial cut-away view of another embodiment of thermal storage recovery and apparatus attached to an industrial oven having two different types of heat storage elements.

FIG. 6 illustrates another embodiment of apparatus according to the invention which includes a thermal storage unit J as being integral with the top of a dryer oven 120. Within the thermal storage unit J is carried a plurality of hot end heat exchange elements 122 which are partly in the wall 120a of the oven and partly inside the oven each having a construction-like element 32. A plurality of cold end heat exchange elements 124 which may be constructed from a non-metallic material such as glass in the form of 33, 94 are carried at the cold end of the thermal storage unit J. In this form, elements 124 are much smaller than elements 122.

Unit 5 is connected to the valve manifold 62 by means of duct 126. A hatch cover 128 is pivotably carried on the thermal storage housing 129 so that the contaminated heat exchange elements 124 may be replaced with clean new elements. The high temperatures in the heat exchange elements 112 volatize the liquid condensate changing the condensate back to gas which will eventually be drawn through the heat exchange elements 124 and exhausted to the atmosphere. As illustrated, the cold end heat exchange elements 124 are stacked upon the hot end heat exchange elements 122. The flow of exhaust and replacement air is cycled through the thermal storage unit J in the same manner as described in FIGS. 3 and 5 in relation to valve 62.

Figure 7:
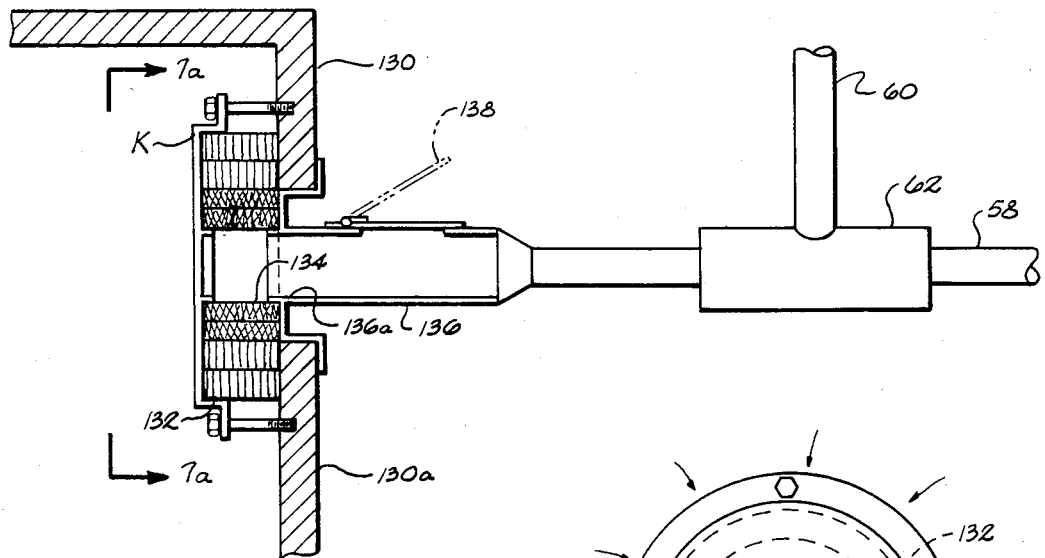
FIG. 7 is a partial cut-away view of another embodiment of heat storage and recovery apparatus attached to the inside of an industrial oven having two different types of heat storage elements according to the invention.
Figure 7A:
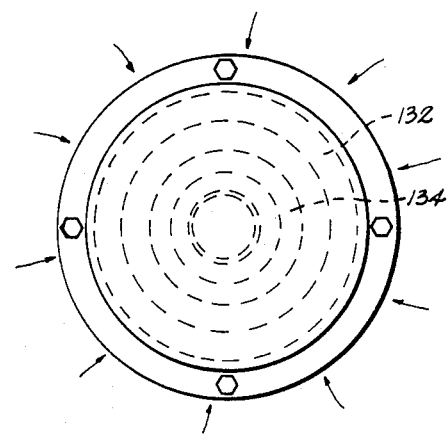
FIG. 7a is a fragmentary side elevation view taken in the direction shows by line 7a–7a of FIG. 7.

FIG. 7 shows yet another embodiment of apparatus according to the invention which includes a thermal storage unit K constructed inside the interior of an industrial dryer oven 130. The thermal storage unit K includes a plurality of metallic heat exchange elements 132 carried at the hot end of the thermal storage unit and a plurality of heat exchange elements 134 carried at the cold end of the thermal storage unit. The cold end of the thermal storage unit is connected to a duct housing 136, to the valve manifold 62. Housing 136 includes a pivotable door 138 providing access to the heat exchange elements.

As illustrated, the thermal storage unit K is circular in configuration such that the flow passing through the structure is radial in nature. Exhaust enters or replacement air leaves at the outer circular boundary where hot end heat exchange elements 132 are located in a flow generally parallel to the wall 130a of the oven. Exhaust leaves or replacement air enters at the inner circular boundary 136a where the cold and heat exchange elements 134 are arranged where the flow would turn generally and flow out to the duct 136. Elements 132 and 134 may be constructed in any compatible configuration such as arcuate members and contain the corresponding cellular and matrix material construction.

Figure 8:
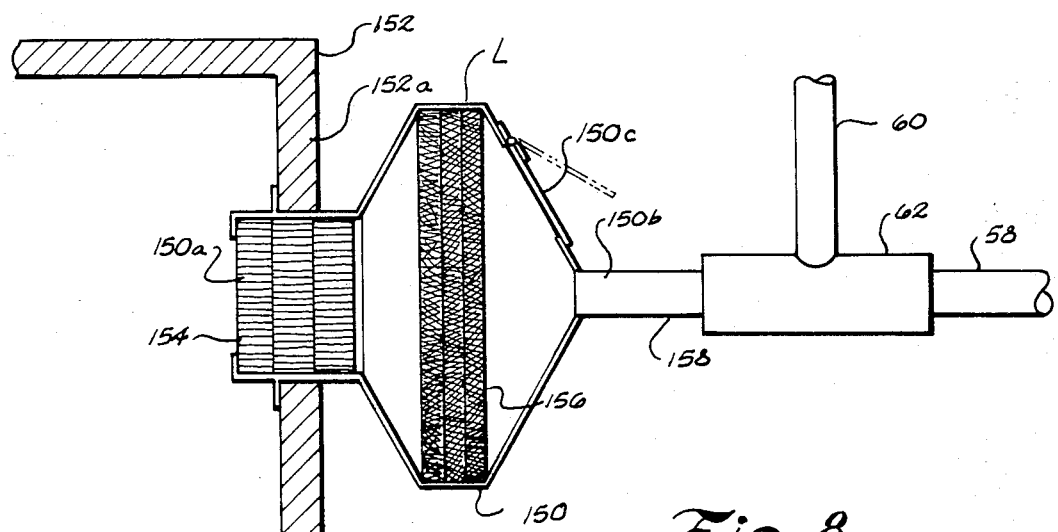
FIG. 8 is a partial cut-away view of yet another embodiment of heat storage and recovery apparatus attached to an indstrial oven having hot-end heat storage elements mounted at the oven wall and cold-end heat storage elements that require frequent cleaning located outside the oven according to the invention.

FIG. 8 illustrates another embodiment of apparatus according to the invention wherein a thermal storage unit L is provided which includes a housing 150 carried in a wall 152a of an industrial dryer oven 152. The housing 150 carries a plurality of heat exchange elements 154 at the hot end of the thermal storage unit and a plurality of heat exchange elements 156 at the cold end of the thermal storage unit which are spaced from the heat exchange elements 154. The thermal storage unit L includes an oven port 150a connected by means of duct work 158 to the valve manifold 62. Flow of exhaust and replacement air is cycled through the thermal storage unit L in opposite directions as described above in relation to FIGS. 3, 5, and 7.

FIG. 8 shows an enlarged thermal storage housing 150 in the region of cold end condensor elements 156. Either 154 or 156 can be constructed round or rectangular but FIG. 8 intends to show a through flow cross-sectional said increase for elements 156 in order to reduce the flux rate of flow through those elements as compared to flux rated through heat transfer elements 154. Elements 156 are cool and will condense manufacturing process contaminants volatilized in the oven and carried by exhaust, and they will require more frequent removal for cleaning or even replacement altogether. The scale of heat storage, films, fibers or threads will be dimensionally smaller and probably with material of less volumetric heat capacity but with more frequent encounters with flow passing through 156. Although the material in 156 may not be store heat as well as material in 154, it will tend to have higher heat transfer co-efficients and also higher aerodynamic drag co-efficients, possibly higher by an order of magnitude of 10.

It therefore becomes prudent to reduce flux to enjoy less drag and less heat transferring which because of the reduced heat capacity would require higher value cycling frequencies to maintain efficient axial thermal gradients within regenerator heat storage.

Figure 10:
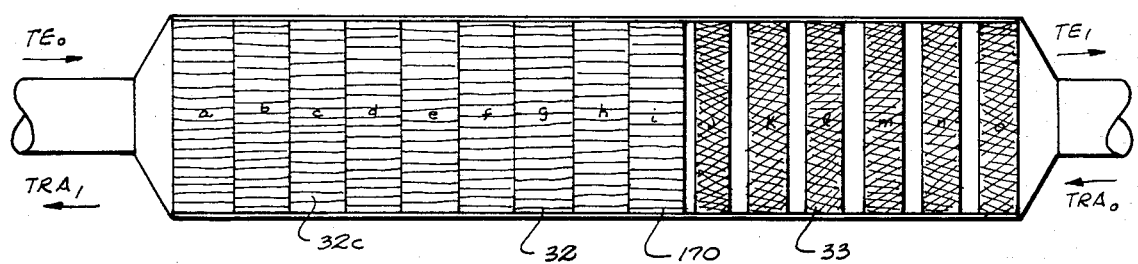
FIG. 10 is a longitudinal sectional view of a thermal storage unit and a plot of heat storage element temperature along the length of the thermal storage unit showing the thermal behavior with two different types of heat storage elements according to the present invention.

FIG. 10 illustrates a plot of the heat exchange and condenser element temperatures at the beginning and end of exhaust and replacement air flow cycles along with the temperature of exhaust air and replacement air at each element location utilizing the different heat elements, a-o, in the thermal storage unit B. The calculations for FIG. 10 were made by dynamic simulation of thermal storage on a computer. Curve 160 represents exhaust gas temperature along the axis of flow through unit B. Curve 162 represents heat storage temperature at each element along the length of unit B after exhaust flow. Line 164 represents heat storage element temperature at each element after replacement air flow through the unit. Line 166 represents replacement air temperatures during flow through thermal storage unit B.

Thus, it can be seen that an advantageous construction for thermal storage units for industrial hot air regenerators can be had according to the invention wherein heat exchange filter elements of a permanent type are utilized at a hot end having heat cell passages through which exhaust gases flow and by which heat is absorbed and heat exchange condensor elements carried at a remote end which filter condensed contaminants at a cold end of the unit. The condensor material contained in the cold end, heat exchange filter elements (rods, films, fibers, etc.) is dimensionally smaller and has less volumetric heat capacity than the material in the hot end heat exchange elements, but provide more contact surface and more frequent encountering of the condensed contaminants passing therethrough.

While a preferred embodiment of the invention has been described using specific terms, such description is for illustrative purposes only, and it is to be understood that changes and variations may be made without departing from the spirit or scope of the following claims.

What is claimed is:

1. Heat exchange filters and condensing apparatus for use in heat recovery and preheating replacement air in industrial heat treating ovens of the type having an oven port communicating with an interior of said dryer oven, exhaust means connected to said port for delivering a flow of exhaust gases from said dryer oven, air flow means connected to said port for sequentially delivering a flow of replacement air to said dryer oven, air flow means connected to said port for sequentially delivering a flow of replacement air to said dryer oven in a direction reverse to that of said flow of exhaust gases, thermal storage means connected in series flow relationship with said port for recovering and storing heat from said exhaust gases, valve means connected in said duct means for selectively controlling and alternating said flows of replacement air and exhaust gases through said thermal storage means, said thermal storage means having a hot end nearest said oven port and a cold end remote from said hot end in said series flow relation, wherein said apparatus comprises a plurality of hot end heat storage filter elements carried in said thermal storage means adjacent said hot end of said thermal storage means constructed from a high temperature material having a high thermal storage capacity for storing heat, said hot end heat storage filter elements each including a plurality of uniform cells defining uniform cell passages open to flow through said elements, and a plurality of cold end heat exchange condensor elements carried at said cold end of said thermal storage means in series with said heat storage filter elements, said cold end condensor elements constructed of a dimensionless material having less thermal storage capacity than said hot end heat storage filter elements so that the temperature corresponds more generally to the gas flow therethrough facilitating condensate runoff from said cold end elements.

2. The apparatus of claim 1 wherein said material of said condensor element includes a low temperature material bound in a matrix structure having random non-uniform air flow passages and points of intersections at which condensate from said exhaust gases is collected.

3. The structure of claim 1 wherein said heat exchange condensor elements are constructed of elongated rod-like strands of said material arranged in a matrix structure forming intersections of said rod-like strands which coalesce condensate to enhance draining of said condensate, and random passages formed between said intersections through which said flow occurs.

4. Heat recovery and replacement air preheating apparatus for use with industrial heater ovens of the type which include an exhaust port for exhaust gases and an inlet port for the flow of replacement air, said apparatus comprising:

a set of thermal storage units each of which includes a housing;

each storage unit housing having a hot end through which said flow of exhaust gas enters said unit and a cold end through the flow of said replacement air enters said unit;

a series of hot end heat storage filter elements carried within a first section of said housing beginning adjacent said hot end and continuing in series flow direction in said housing toward said cold end;

a series of heat exchange cold end condensor elements carried in a second section of said housing beginning after said series of heat storage filter elements and continuing toward and terminating adjacent said cold end of said thermal storage unit housing;

each said heat storage filter element including an outer shell, a plurality of heat storage cells carried in said shell formed by an arrangement of heat exchange boundary surfaces defining a cellular flow passages, said cells being constructed of a high temperature material having a high thermal storage capacity for storing thermal energy; and each said cold end condensor element including means for condensing volatile contaminants from said exhaust gases which includes boundary material defining flow passages arranged to collect said condensate without obstructing the flow through said flow passages.

5. The apparatus of claim 4 wherein said condensor element includes an outer shell, and said boundary material includes a matrix arrangement of elongated strands of rod-like material randomly laid to intersect and define random flow passages between said intersections of material, said strand intersections providing coalescence of said condensate at said intersections to provide means whereby said condensate is collected without blocking said random flow passages.

6. The apparatus of claim 4 wherein said hot end heat storage element has a higher thermal storage capacity than the material of said condensor element, and said material of said cold end condensor element has a higher convective heat transfer co-efficient than said material of said heat hot end storage filter element to compensate for the lower thermal capacity thereof and to facilitate faster cycling of exhaust and replacement air through said unit.

7. The apparatus of claim 4 wherein heat exchange boundary surfaces of said hot end heat storage filter elements have a dimension in the direction of said flow therethrough facilitating heat transfer, said boundary material of said cold end condensor elements being generally dimensionless in the direction of flow but having an increased surface area presented normal to said flow enhancing condensation of said volatile contaminants impinging thereon.

8. The apparatus of claim 4 including means for draining said condensate from said condensor elements and said storage unit housing.

9. The apparatus of claim 8 wherein said housing is carried at an incline with respect to the axis of flow therethrough, said means for draining said housing including a drain formed in a lowermost portion of said housing below said condensor elements in said second section of said housing.

10. The apparatus of claim 4 wherein said second section of said housing of said thermal storage unit is enlarged relative to said first section and is remote therefrom, said cold end condensor elements having a greater cross-sectional area than said hot end heat storage filter elements so that the flux of said flow is slowed through said cold end condensor element to enhance condensation.

11. The apparatus of claim 6 wherein said boundary material of said cold end condensor element is polypropylene.

12. In a method of recovering heat and heating replacement air in industrial heat treating ovens of the type which includes alternately cycling a flow of exhaust gases and replacement air through a set of thermal storage units carried exteriorly of the oven which are connected to the oven by means of spaced ports, storing the heat from the exhaust in one of the thermal storage units while purging the heat previously stored in the other of the thermal storage units to heat the replacement air, wherein the method comprises:

providing a plurality of hot end heat storage filter elements in said thermal storage unit in series flow relation having a high thermal storage capacity for storing heat;

providing a plurality of cold end heat exchange condensor elements in series flow arrangement with said hot end heat storage filter elements in said thermal storage unit having a thermal storage capacity lower than said hot end heat storage filter elements for condensing volatile contaminants in said exhaust gases;

passing said exhaust gases through said hot end heat storage filter elements transferring the heat from said exhaust flow into said hot end heat storage elements and filtering solid contaminants from said exhaust gas flow;

passing said exhaust flow through said cold end condensor elements after removing said solid contaminants and condensating volatile gases in said exhaust flow and collecting said condensate in said cold end condensor element; and removing said condensated contaminants.

13. The method of claim 12 including passing said exhaust gas through generally uniform straight passages in said hot end heat storage filter element, and through random non-uniform passages in said cold end condensor elements.

14. The method of claim 12 including:
providing cold end condensor elements having random air flow passages defined by intersecting boundary material providing coalescence points at the intersections of said material where said condensate coalesces facilitating open passage of flow through said air flow passages.

15. The method of claim 12 including:
providing heat storage filter elements having heat storage cells constructed from a high temperature metallic or ceramic material having a large thermal storage capacity; and
providing cold end condensor elements constructed of a low temperature non-metallic material having a lower thermal storage capacity than said heat storage filter elements.

16. The method of claim 12 including:
providing hot end heat storage filter elements having heat exchange surfaces having a dimension parallel to said air flow passages; and
providing cold end condensor elements having intersection material generally dimensionless in the direction of flow but presenting increased surface area generally perpendicular to the direction of flow enhancing condensation.

17. The method of claim 16 wherein said condensor element material has a higher convective heat transfer co-efficient than said material of said hot end heat storage filter element.

* * * * *